United States Patent
Suzuki

Patent Number: 5,359,406
Date of Patent: Oct. 25, 1994

[54] LUMINOUS FLUX MEASURING APPARATUS WHICH CALCULATES SPECTRAL EFFICIENCIES FOR ERROR COMPENSATION

[75] Inventor: Kenichi Suzuki, Hirakata, Japan

[73] Assignee: Matsushita Electric Industrial Co., Ltd., Osaka, Japan

[21] Appl. No.: 60,983

[22] Filed: May 14, 1993

[30] Foreign Application Priority Data

May 15, 1992 [JP] Japan ................. 4-123011

[51] Int. Cl.$^5$ .............................. G01J 1/42
[52] U.S. Cl. ......................... 356/236; 250/228
[58] Field of Search ............ 356/230, 231, 232, 229, 356/218, 236; 250/228

[56] References Cited

FOREIGN PATENT DOCUMENTS 3-233338 10/1991 Japan .

Primary Examiner—Richard A. Rosenberger
Assistant Examiner—Robert Kim
Attorney, Agent, or Firm—Wenderoth, Lind & Ponack

[57] ABSTRACT

A luminous flux measuring apparatus for measuring a spectral radiant flux or a total flux of a lamp includes an integrating sphere having a light sensing window defined therein, a spectrometer for measuring light transmitted through the light sensing window, a spectral radiant flux operation unit, and a total flux operation unit. When a standard lamp is lightened inside the integrating sphere, the output $I_{std0}(\lambda)$ of the spectrometer is measured. Thereafter, the $I_{std1}(\lambda)$ of the spectrometer is measured with a light absorption sheet placed inside the integrating sphere. Likewise, the outputs $I_{m0}(\lambda)$ and $I_{m1}(\lambda)$ of the spectrometer are measured with the light absorption sheet placed inside the integrating sphere and with no light-absorption means placed inside the integrating sphere, respectively. Upon input of $I_{std0}(\lambda)$, $I_{std1}(\lambda)$, $I_{m0}(\lambda)$, and $I_{m1}(\lambda)$ into the spectral radiant flux operation unit, this unit calculates the spectral efficiency $Q_{std}(\lambda)$ of the integrating sphere with the standard lamp and the spectral efficiency $Q_m(\lambda)$ of the integrating sphere with the lamp to be measured. Using $Q_{std}(\lambda)$, $Q_m(\lambda)$, $I_{std0}(\lambda)$, $I_{m0}(\lambda)$, and a known spectral radiant flux value $P_{std}(\lambda)$ of the standard lamp, the spectral radiant flux operation unit calculates the spectral radiant flux $P_m(\lambda)$ of the lamp to be measured. The total flux operation unit calculates the total flux value $F_m$ of the lamp using the spectral radiant flux $P_m(\lambda)$.

8 Claims, 2 Drawing Sheets

LUMINOUS FLUX MEASURING APPARATUS WHICH CALCULATES SPECTRAL EFFICIENCIES FOR ERROR COMPENSATION

BACKGROUND OF THE INVENTION

1. Field of the Invention

The present invention relates generally to optical radiometry and, more particularly, to an apparatus for measuring a spectral radiant flux or a total flux of a lamp by the use of an integrating photometer, which is in wide practical use today in the field of optical radiometry.

2. Description of the Prior Art

In development or quality control of incandescent lamps or various discharge lamps, an accurate measurement of the total flux value of a lamp is especially important. In measuring the total flux of the lamp, an integrating photometer is generally used. The integrating photometer is a device which comprises an integrating sphere having a light sensing window defined in a wall thereof, a spectrometer for measuring light transmitted through the window, a lamp holder for holding and lightening a lamp to be measured inside the integrating sphere, and a light shielding plate for shielding that portion of light, emitted from the lamp when the lamp is turned on, which travels directly towards the window. The entire interior wall surface of the integrating sphere is a white diffusion surface so as to permit the interior wall surface to exhibit a uniform illuminance, when radiated by the lamp, by the effect of interreflection taking place inside the integrating sphere.

A total flux measuring apparatus currently in use measures the total flux of the lamp by comparing it with a known total flux value of a standard lamp. Because the lamp is turned on inside the integrating sphere during the measurement, the integrating photometer can be used in a bright room. For this reason, the integrating photometer is utilized not only in total flux measurement, but also in spectral distribution measurement wherein a spectrometer is mounted on the light sensing window. Also, the integrating photometer is widely used in lamp manufacturing factories or in lamp development sections.

The integrating photometer, however, has the following problems: In the first place, a white diffusion layer coated on the interior wall of the integrating sphere does not have a 100% reflectance and has such a wavelength selectivity that the reflectance varies according to the wavelength. Secondly, the presence of the light shielding plate inside the integrating sphere hampers sufficient interreflection. Yet, the wavelength selectivity or the extent to which the interreflection occurs varies according to the lamp to be measured.

For these reasons, if the lamp to be measured differs from the standard lamp in spectral distribution, distribution of luminous intensity, self-absorption, or the like, the integrating photometer is apt to give rise to a considerable measurement error and, hence, the integrating photometer is generally used as a practical instrument.

On the other hand, in order to compensate for the measurement error, attempts have hitherto been carried out to find out the characteristic of the integrating photometer.

Japanese Laid-open Patent Publication No. 3-233338 discloses a method of measuring the reflectance of an interior wall surface of the integrating sphere with the use of a light absorption sheet. This method is utilized to find out the spectral characteristic of the integrating photometer.

Also, a technique of analyzing interreflection characteristics inside the integrating photometer has hitherto been reported ("Analysis of an Integrating Sphere by Computer Simulation" written by Yoshihiro Ohno in 1987).

As described hereinabove, although analysis of the basic characteristic of the integrating photometer has been proposed up to this time, no attempts have been made to the application thereof to the total flux measurement.

SUMMARY OF THE INVENTION

The present invention has been developed to overcome the above-described disadvantages.

It is accordingly an object of the present invention to provide a luminous flux measuring apparatus capable of accurately measuring not only a spectral radiant flux but a total flux of a lamp by compensating for measurement errors caused by the integrating photometer, which errors include (1) measurement errors attributable to the fact that the integrating photometer has a spectral characteristic, (2) measurement errors caused by self-absorption of the lamp, and (3) errors caused by a variation in distribution of luminous intensity.

Another object of the present invention is to provide a luminous flux measuring apparatus of the above-described type which has a simple structure and can be readily manufactured at a low cost.

In accomplishing the above and other objects, the luminous flux measuring apparatus according to the present invention includes a standard lamp having a known spectral radiant flux value of $P_{std}(\lambda)$, an integrating sphere having an interior surface area of A and also having a light sensing window defined therein, a lamp holder for holding and lightening any one of the standard lamp and a lamp to be measured inside the integrating sphere, and a photometer means for measuring light transmitted through the light sensing window. The luminous flux measuring apparatus according to the present invention further includes a first light shielding means for shielding that portion of light, emitted from the standard lamp or the lamp to be measured, which travels directly towards the light sensing window, a light absorption means for attenuating light inside the integrating sphere, and a second light shielding means for shielding that portion of light, emitted from the standard lamp or the lamp to be measured, which travels directly towards the light absorption means. The luminous flux measuring apparatus according to the present invention also includes a spectral radiant flux operation means for calculating the spectral radiant flux $P_m(\lambda)$ of the lamp upon receipt of outputs from the photometer means.

By this construction, after the standard lamp has been turned on, outputs $I_{std0}(\lambda)$ and $I_{std1}(\lambda)$ of the photometer means are initially measured under the condition in which the light absorption means is activated inside the integrating sphere and under the condition in which the light absorption means is deactivated, respectively. Thereafter, the standard lamp is replaced by the lamp to be measured, which is in turn lightened, and outputs $I_{m0}(\lambda)$ and $I_{m1}(\lambda)$ of the photometer means are measured under the condition in which the light absorption means is activated inside the integrating sphere and under the condition in which the light absorption means is deactivated, respectively.

Upon input of these outputs into the spectral radiant flux operation means, the spectral radiant flux operation means calculates the spectral efficiency $Q_{std}(\lambda)$ of the integrating sphere with the standard lamp, and also calculates the spectral efficiency $Q_m(\lambda)$ of the integrating sphere with the lamp to be measured. The spectral radiant flux operation means then finds the spectral radiant flux $P_m(\lambda)$ of the lamp to be measured using the spectral efficiencies $Q_{std}(\lambda)$ and $Q_m(\lambda)$, the outputs $I_{std0}(\lambda)$ and $I_{m0}(\lambda)$ of the photometer means, and the known spectral radiant flux value $P_{std}(\lambda)$ of the standard lamp.

Preferably, the luminous flux measuring apparatus further includes a total flux operation means, which calculates the total flux value $F_m$ of the lamp using the spectral radiant flux $P_m(\lambda)$.

As described hereinabove, by finding the efficiency of the integrating photometer with the standard lamp and that of the integrating photometer with the lamp to be measured, and by compensating for a change of the two efficiencies, the aforementioned measurement errors (1) and (2) can be appropriately compensated for.

Advantageously, the luminous flux measuring apparatus includes an interreflection operation means for calculating the irradiance $D_{std}(\lambda)$ per unit spectral radiant flux of the standard lamp and the irradiance $D_m(\lambda)$ per unit spectral radiant flux of the lamp to be measured at the light sensing window. In this case, the spectral radiant flux operation means calculates the spectral reflectance $\rho_{std}(\lambda)$ of the integrating sphere with the standard lamp and the spectral reflectance $\rho_m(\lambda)$ of the integrating sphere with the lamp to be measured. These spectral reflectances $\rho_{std}(\lambda)$ and $\rho_m(\lambda)$, data associated with the structure of the integrating photometer, and data associated with the luminous intensity distribution characteristics of the standard lamp and the lamp to be measured are inputted into the interreflection operation means for calculation of the irradiances $D_{std}(\lambda)$ and $D_m(\lambda)$.

The spectral radiant flux operation means then finds the spectral radiant flux $P_m(\lambda)$ of the lamp to be measured using the irradiances $D_{std}(\lambda)$ and $D_m(\lambda)$, the spectral efficiencies $Q_{std}(\lambda)$ and $Q_m(\lambda)$, the outputs $I_{std0}(\lambda)$ and $I_{m0}(\lambda)$ of the photometer means, and the known spectral radiant flux value $P_{std}(\lambda)$ of the standard lamp. In this case also, the total flux operation means calculates the total flux value $F_m$ of the lamp using the spectral radiant flux $P_m(\lambda)$.

By doing so, the aforementioned errors (3) can be appropriately compensated for based on a change in irradiance.

As a result, in measuring the total flux or the spectral distribution of a lamp, the measurement accuracy of the integrating photometer is remarkably enhanced.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
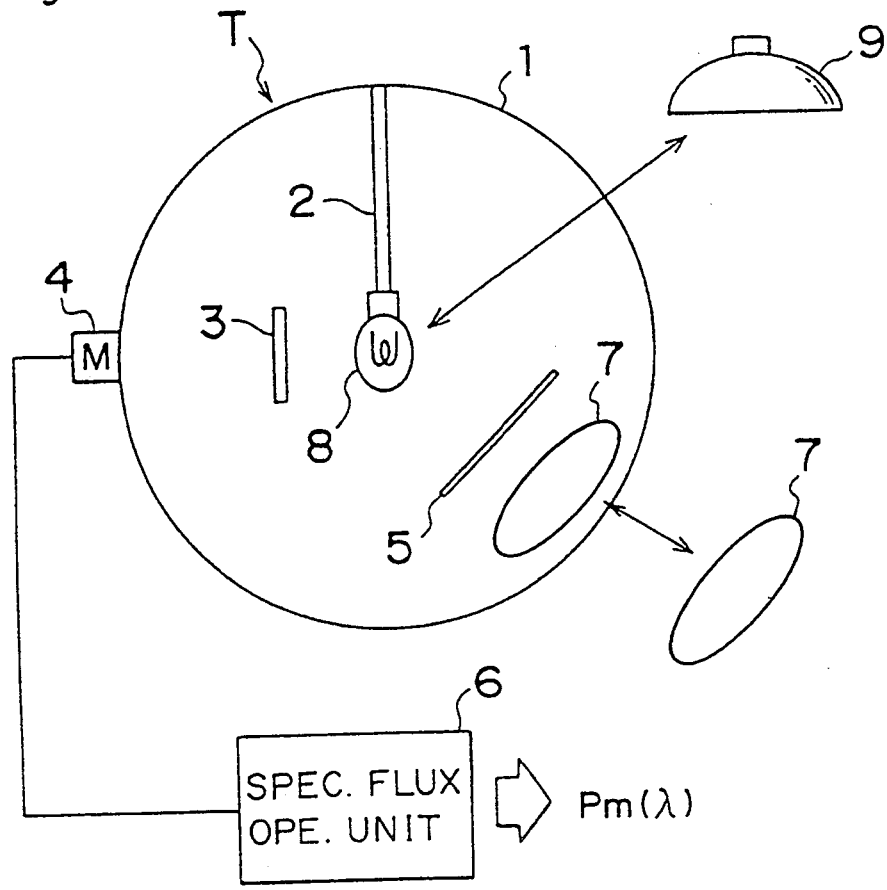
FIG. 1 is a schematic view of a total flux measuring apparatus according to the present invention.

Referring now to the drawings, there is shown in FIG. 1 a luminous flux measuring apparatus T embodying the present invention.

As shown in FIG. 1, the luminous flux measuring apparatus T comprises an integrating sphere 1 having a light sensing window defined therein, a lamp holder 2 for holding and lightening a standard lamp 8 or a lamp 9 to be measured, two light shielding plates 3 and 5, a spectrometer 4 for measuring light transmitted through the light sensing window, and a spectral radiant flux operation unit 6. The lamp holder 2 and the light shielding plates 3 and 5 are secured to an interior wall surface of the integrating sphere 1. The spectrometer 4, to which the spectral radiant flux operation unit 6 is operatively connected, is securely mounted on an exterior wall surface of the integrating sphere 1. The light shielding plate 3 is so configured as to appropriately shield that portion of light, emitted from the lamp 8 or 9, which travels directly towards the spectrometer 4. A light absorption sheet 7 is overlaid on a specific portion of the interior wall surface of the integrating sphere 1, as occasion demands. The light shielding plate 5 is so configured as to appropriately shield that portion of light, emitted from the lamp 8 or 9, which travels directly towards the light absorption sheet 7 placed on the specific location of the interior surface wall of the integrating sphere 1.

The standard lamp 8 is initially mounted on and held by the lamp holder 2 and is subsequently turned on for measurement of the output $I_{std0}(\lambda)$ of the spectrometer 4 with no light absorption sheet placed inside the integrating sphere 1. Thereafter, the output $I_{std1}(\lambda)$ of the spectrometer 4 is measured with the light absorption sheet 7 placed inside the integrating sphere 1.

The standard lamp 8 is then replaced by the lamp 9 to be measured. In this case also, the output $I_{m0}(\lambda)$ of the spectrometer 4 is measured with no light absorption sheet placed inside the integrating sphere 1, and the output $I_{m1}(\lambda)$ of the spectrometer 4 is measured with the light absorption sheet 7 placed inside the integrating sphere 1.

The measured $I_{std0}(\lambda)$, $I_{std1}(\lambda)$, $I_{m0}(\lambda)$, and $I_{m1}(\lambda)$ are successively inputted to the spectral radiant flux operation unit 6, which in turn calculates the spectral efficiency $Q_{std}(\lambda)$ of the integrating sphere 1 with the standard lamp 8 and the spectral efficiency $Q_m(\lambda)$ of the integrating sphere 1 with the lamp 9 using the following equations (1) and (2), respectively:

$$Q_{std}(\lambda) = \frac{1 - a_{std}(\lambda) \cdot (1 - c \cdot \rho_{abs}(\lambda))}{c \cdot a_{std}(\lambda) \cdot (1 - \rho_{abs}(\lambda))} \quad (1)$$

$$Q_m(\lambda) = \frac{1 - a_m(\lambda) \cdot (1 - c \cdot \rho_{abs}(\lambda))}{c \cdot a_m(\lambda) \cdot (1 - \rho_{abs}(\lambda))} \quad (2)$$

where $a_{std}(\lambda) = I_{std1}(\lambda)/I_{std0}(\lambda)$, $a_m(\lambda) = I_{m1}(\lambda)/I_{m0}(\lambda)$, and $c = s/A$.

The spectral radiant flux operation unit 6 then outputs the spectral radiant flux $P_m(\lambda)$ of the lamp 9 on the basis of the calculated $Q_{std}(\lambda)$ and $Q_m(\lambda)$, $I_{std0}(\lambda)$, and $I_{m0}(\lambda)$, using an equation given by $$P_m(\lambda) + \frac{I_{m0}(\lambda)}{I_{std0}(\lambda)} \cdot \frac{Q_m(\lambda)}{Q_{std}(\lambda)} \cdot P_{std}(\lambda). \tag{3}$$

The spectral radiant flux operation unit 6 stores therein data of the interior surface area A of the integrating sphere 1, the area s of the light absorption sheet 7, the spectral reflectance $\rho_{abs}(\lambda)$, and the spectral radiant flux value $P_{std}(\lambda)$ of the standard lamp 8, all required for calculations given by the equations (1), (2), and (3), and performs these calculations upon receipt of the outputs $I_{std0}(\lambda)$, $I_{std1}(\lambda)$, $I_{m0}(\lambda)$, and $I_{m1}(\lambda)$ of the spectrometer 4. The spectral radiant flux operation unit 6 then finds the spectral radiant flux $P_m(\lambda)$ of the lamp 9.

Figure 2:
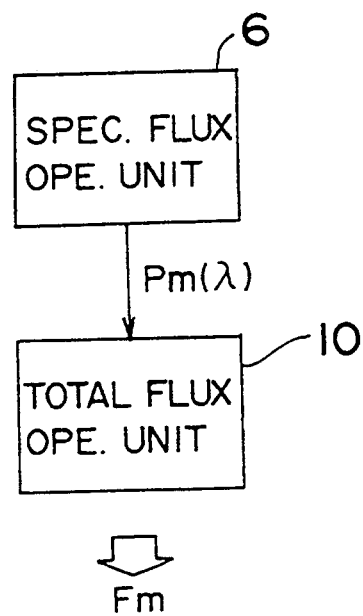
FIG. 2 is a block diagram of a spectral radiant flux operation unit and a total flux operation unit, both employed in the apparatus of FIG. 1.

As shown in FIG. 2, the spectral radiant flux $P_m(\lambda)$ outputted from the spectral radiant flux operation unit 6 is inputted into a total flux operation unit 10, which in turn performs a calculation given by the following equation (4) and outputs $F_m$ indicating the total flux value of the lamp 9.

$$F_m = K_m \cdot \Sigma(P_m(\lambda) \cdot V(\lambda) \cdot \lambda) \tag{4}$$

where $V(\lambda)$, $\lambda$, and $K_m$ indicate the standard luminous efficacy, the wave range of the $P_m(\lambda)$, and the maximum luminous efficacy ($K_m = 683$ lm/W), respectively.

The total flux operation unit 10 stores therein the standard luminous efficacy $V(\lambda)$ and the maximum luminous efficacy $K_m$, and hence, upon input of the spectral radiant flux $P_m(\lambda)$ thereto, the total flux value $F_m$ is obtained by the equation (4).

Figure 3:
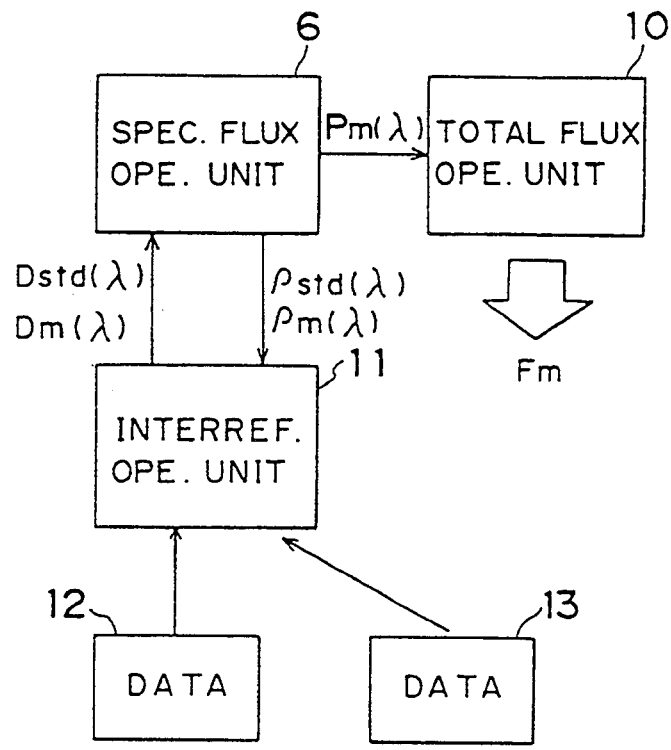
FIG. 3 is a diagram similar to FIG. 2, but indicating a modification thereof.

As shown in FIG. 3, the spectral radiant flux operation unit 6 may be operatively coupled with an interreflection operation unit 11, to which structure data 12 associated with the structure of the integrating photometer and characteristic data 13 associated with the distribution of luminous intensity of the standard lamp 8 and the lamp 9 to be measured are inputted. The structure data 12 indicate the configuration, the position and the like of the integrating sphere 1, the light shielding plates 3 and 5, and other constituent elements.

The spectral radiant flux operation unit 6 calculates the spectral reflectance $\rho_{std}(\lambda)$ of the integrating sphere 1 with the standard lamp and the spectral reflectance $\rho_m(\lambda)$ of the integrating sphere 1 with the lamp 9 to be measured, using the following equations (5) and (6).

$$\rho_{std}(\lambda) = \frac{1 - a_{std}(\lambda) \cdot (1 - c \cdot \rho_{abs}(\lambda))}{1 - a_{std}(\lambda) \cdot (1 - c)} \tag{5}$$

$$\rho_m(\lambda) = \frac{1 - a_m(\lambda) \cdot (1 - c \cdot \rho_{abs}(\lambda))}{1 - a_m(\lambda) \cdot (1 - c)} \tag{6}$$

The calculated $\rho_{std}(\lambda)$ and $\rho_m(\lambda)$ along with the data 12 and 13 are inputted into the interreflection operation unit 11, which in turn performs an interreflection calculation and outputs to the spectral radiant flux operation unit 6 the irradiance $D_{std}(\lambda)$ per unit spectral radiant flux of the standard lamp 8 and the irradiance $D_m(\lambda)$ per unit spectral radiant flux of the lamp 9 at the light sensing window of the integrating sphere 1. Upon receipt of the $D_{std}(\lambda)$ and $D_m(\lambda)$, the spectral radiant flux operation unit 6 finds the spectral radiant flux $P_m(\lambda)$ of the lamp 9 using an equation given by $$P_m(\lambda) + \frac{I_{m0}(\lambda)}{I_{std0}(\lambda)} \cdot \frac{Q_m(\lambda)}{Q_{std}(\lambda)} \cdot \frac{D_m(\lambda)}{D_{std}(\lambda)} \cdot P_{std}(\lambda). \tag{7}$$

It is to be noted here that the quantity of operation can be reduced by the use of, as the data 13, data obtained by a luminous intensity distribution measuring apparatus and normalized so that the total flux value may be a unit quantity.

When a uniform luminous flux is imparted by lightening a lamp accommodated in an integrating photometer having an interior area of A, let the output of the spectrometer be $I_0(\lambda)$ at a wavelength of $\lambda$, and when this lamp is lightened under the condition in which a light absorption sheet having an area of s and a spectral reflectance of $\rho_{abs}(\lambda)$ is placed on the interior wall surface of the integrating photometer, let the output of the spectrometer be $I_1(\lambda)$. In this case, the spectral reflectance $\rho\lambda$ of the interior wall surface is given by the following equation (8), as disclosed in Japanese Laid-open Patent Publication No. 3-233338.

$$\rho(\lambda) = \frac{1 - a(\lambda) \cdot (1 - c \cdot \rho_{abs}(\lambda))}{1 - a(\lambda) \cdot (1 - c)} \tag{8}$$

where $a(\lambda) = I_1(\lambda)/I_0(\lambda)$ and $c = s/A$.

It is supposed that light from the light source is not directly applied to the light absorption sheet. The $\rho(\lambda)$ given by the equation (8) is the spectral reflectance including the influence of the objects such as, for example, the light shielding plates, the lamp holder and the like accommodated in the integrating photometer during the measurement and also including the influence of self-absorption of the lamps.

On the other hand, the spectral efficiency $Q(\lambda)$ of the integrating photometer is given by:

$$Q(\lambda) = \frac{\rho(\lambda)}{(1 - \rho(\lambda))}. \tag{9}$$

If the equation (8) is substituted for the $\rho(\lambda)$ in the equation (9), we obtain the following equation (10). Hence, the spectral efficiency $Q(\lambda)$ of the integrating photometer can be calculated using the outputs $I_0(\lambda)$ and $I_1(\lambda)$ of the spectrometer, the interior area A of the integrating sphere, and the area s and the spectral reflectance $\rho_{abs}(\lambda)$ of the light absorption sheet, and using the equation (10).

$$Q(\lambda) = \frac{1 - a(\lambda) \cdot (1 - c \cdot \rho_{abs}(\lambda))}{c \cdot a(\lambda) \cdot (1 - \rho_{abs}(\lambda))} \tag{10}$$

Accordingly, under the condition in which each of the standard lamp 8 and the lamp 9 to be measured is lightened, a change in spectral reflectance and that in spectral efficiency can be obtained by calculating the spectral reflectances $\rho_{std}(\lambda)$ an $\rho_m(\lambda)$ and the spectral efficiencies $Q_{std}(\lambda)$ and $Q_m(\lambda)$ with the use of the equations (5), (6), (1), and (2), respectively.

The spectral radiant flux $P(\lambda)$ at a wavelength of $\lambda$ is given by:

$$P(\lambda) = A \cdot Q(\lambda) \cdot D(\lambda) \tag{11}$$

where $D(\lambda)$ indicates the spectral irradiance on the light sensing window.

At this moment, when the output of the spectrometer and the spectral characteristic including the spectral transmittance of the light sensing window, the spectral responsivity of the spectrometer, and the like are indicated by $I(\lambda)$ and a coefficient $k(\lambda)$, respectively, the spectral irradiance $D(\lambda)$ is given by:

$$D(\lambda) = k(\lambda) \cdot I(\lambda) \tag{12}$$

Furthermore, the spectral radiant flux $P_m(\lambda)$ of the lamp 9 to be measured can be obtained using the equation (3) derived from the equations (11) and (12).

The irradiance $D(\lambda)$ on the light sensing window can be divided into the direct irradiance $D_0(\lambda)$ by the lamp and the diffuse irradiance $D_d(\lambda)$ by interreflection and is expressed as follows.

$$D(\lambda) = D_0(\lambda) + D_d(\lambda) \tag{13}$$

When the irradiance after the $i^{th}$ reflection is expressed by $D_i(\lambda)$, the $D_d(\lambda)$ is given by:

$$D_d(\lambda) \approx \sum_{i=0}^{i=k} (D_i(\lambda)). \tag{14}$$

Although the equation (14) is an approximate expression, this equation can be considered an equality, if $k \to \infty$. In practice, if the calculation is performed until the spectral radiant flux after the $i^{th}$ reflection becomes about 5% of an initial value, the $D_d(\lambda)$ can be sufficiently approximated.

In applications where the interior surface of the integrating photometer is divided into n elements, the spectral irradiance $D_{ij}(\lambda)$ at an element surface j after the $i^{th}$ reflection is given by:

$$D_{ij}(\lambda) \approx \left(\frac{1}{\pi}\right) \cdot \sum_{h=0}^{h=n} (\rho_h(\lambda) \cdot D_{(i-1)h}(\lambda) \cdot S_{jh} \cdot T_{jh} \cdot U_h) \tag{15}$$

where $\rho_h(\lambda)$, $D_{(i-1)h}(\lambda)$, $S_{jh}$, $T_{jh}$, and $U_h$ indicate the spectral reflectance of an element surface h, the spectral irradiance at the element surface h after the $(i-1)^{th}$ reflection, a shielding function indicating as to whether or not a shielding member is placed between an element surface J and an element surface k, a positional function indicating the distance and the angle between the two element surfaces j and k, and the area of the element surface h, respectively.

When the element surface j is chosen to be the light sensing window of the integrating photometer, the irradiance $D(\lambda)$ at the light sensing window resulting from the interreflection can be obtained by the equations (13), (14), and (15). It can be known from the equation (15) that the $D(\lambda)$ greatly depends upon the distribution of luminous intensity of the lamp and the spectral reflectance of the integrating photometer. Because the white diffusion surface of the integrating photometer is uniform, the $\rho_h(\lambda)$ in the equation (15) can be replaced by the $\rho(\lambda)$ in the equation (8).

Accordingly, by finding the reflectance $\rho_{std}(\lambda)$ of the integrating photometer with the standard lamp and the reflectance $\rho_m(\lambda)$ of the integrating photometer with the lamp to be measured, and by calculating the irradiance $D_{std}(\lambda)$ per unit spectral radiant flux of the standard lamp and the irradiance $D_m(\lambda)$ per unit spectral radiant flux of the lamp to be measured at the light sensing window of the integrating sphere using the $\rho_{std}(\lambda)$, the $\rho_m(\lambda)$, the luminous intensity distribution characteristic of the standard lamp, and that of the lamp to be measured, if the equation (3) is appropriately corrected, the spectral radiant flux $P_m(\lambda)$ of the lamp to be measured is given by the equation (7). The total flux value $F_m$ of the lamp is obtained from the equation (4) using the spectral radiant flux $P_m(\lambda)$ given by the equation (7).

As described hereinabove, the equations (13), (14), and (15) are preferably employed in interreflection calculations performed by the interreflection operation unit 11. The interreflection calculations are terminated at the time the calculated spectral radiant flux becomes nearly equal to 5% of the initial value after reflection has been repeated several times.

Calculations in connection with the structure data 12 of the integrating photometer are preferably performed in advance by the interreflection operation unit 11.

Figure 4:
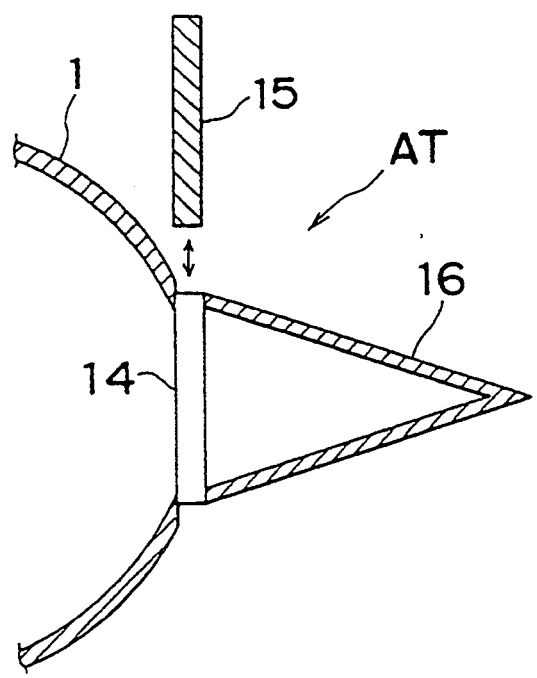
FIG. 4 is a sectional view of an optical attenuator employed in the apparatus of FIG. 1.

The light absorption sheet 7 may be replaced by an optical attenuator AT securely mounted on the integrating sphere 1, as shown in FIG. 4. In this case, the integrating sphere 1 has an opening 14 defined therein at the location of the light absorption sheet 7. The optical attenuator AT has a light absorption portion 16 in the form of a hollow circular cone extending radially outwardly from a peripheral edge of the opening 14. The light absorption portion 16 has an interior surface coated with a light absorption material, which absorbs all light emitted from the opening 14. The light absorption portion 16 has an effective area of s, along the opening 14, required to attenuate light inside the integrating sphere 1. Accordingly, that portion of light inside the integrating sphere 1 which passes through the opening 14 is absorbed by the light absorption portion 16 of the optical attenuator AT.

The opening 14 can be closed by a cover 15, an interior surface of which is coated with the same material as that of the interior surface of the integrating sphere 1. The cover 15 prevents the light inside the integrating sphere 1 from being radiated outwardly through the opening 14.

When the opening 14 is covered with the cover 15, the interior conditions of the integrating sphere 1 are substantially the same as those of the integrating sphere 1 having no light absorption sheet. In contrast, when the opening 14 is opened, the interior conditions of the integrating sphere 1 are substantially the same as those of the integrating sphere 1 having the light absorption sheet 7. In this case, the light absorption portion 16 of the optical attenuator AT attenuates light inside the integrating sphere 1, as is the case with the light absorption sheet 7.

Preferably, the surface of the light absorption portion 16 coated with the light absorption material is made glossy or is chosen to be a surface required to allow mirror reflection. Furthermore, the apparent spectral reflectance at the time the cover 15 is removed is preferably zero.

As is clear from the above, according to the present invention, the spectral radiant flux can be measured with accuracy by compensating for error factors caused by, for example, variations in spectral characteristic of the integrating photometer, self-absorption of the lamps, and the like. Also, because the efficiency of the integrating sphere is measured during measurement, not only calibration by the use of the standard lamp, but also heat-up of the integrating sphere and humidity control of the coated wall surface of the integrating sphere, both of which have hither been required during measurement, are no longer required. In addition, the total flux can be measured with accuracy.

Furthermore, according to the present invention, accurate measurement of the spectral radiant flux can be performed by compensating for error factors caused even by a variation in luminous intensity distribution characteristic, and hence, the spectral radiant flux in a system provided with a lamp or light source having a large light absorptance can be measured with accuracy, though such a system has caused a considerably large measurement error when a conventional measuring apparatus is employed therein. Moreover, because the reflectance is measured during the measurement of the spectral radiant flux, maintenance or control of the interior wall surface of the integrating sphere is facilitated. Also, the total flux value in the aforementioned system provided with a lamp or light source having a large light absorptance can be accurately measured.

In addition, according to the present invention, contamination Of the interior wall surface of the integrating sphere or that of the light absorption sheet, which tends to occur at the time the light absorption sheet is placed on the interior wall surface of the integrating sphere, can be eliminated. Furthermore, because the integrating sphere and the optical attenuator are joined to each other, the apparatus according to the present invention can be used even in a bright room. Also, because light inside the integrating sphere can be attenuated from outside, not only the measurement is facilitated, but also the apparatus can be applied to automatic instrumentation.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A luminous flux measuring apparatus comprising:
   a standard lamp having a known spectral radiant flux value of $P_{std}(\lambda)$;
   an integrating sphere having an interior surface area of A and also having a light sensing window defined therein;
   a lamp holder for holding and lightening any one of said standard lamp and a lamp to be measured inside said integrating sphere;
   a photometer means for measuring light transmitted through said light sensing window;
   a first light shielding means for shielding, when said any one of said standard lamp and said lamp is lightened inside said integrating sphere, a portion of light emitted therefrom that travels directly towards said light sensing window;
   a light absorption means for attenuating, when said any one of said standard light and said lamp is lightened, light inside said integrating sphere, said light absorption means having a spectral reflectance of $\rho_{abs}(\lambda)$ and an area of s required to attenuate the light inside said integrating sphere;
   a second light shielding means for shielding, when said any one of said standard lamp and said lamp is lightened inside said integrating sphere, a portion of light emitted therefrom that travels directly towards said light absorption means; and
   a spectral radiant flux operation means for calculating a spectral radiant flux $P_m(\lambda)$ of said lamp upon receipt of outputs from said photometer means,
   wherein said spectral radiant flux operation means calculates, when said standard lamp is held by said lamp holder and is lightened inside said integrating sphere, a spectral efficiency $Q_{std}(\lambda)$ of said integrating sphere using an equation (1), and also calculates, when said lamp is held by said lamp holder and is lightened inside said integrating sphere, a spectral efficiency $Q_m(\lambda)$ of said integrating sphere using an equation (2), and wherein the spectral radiant flux $P_m(\lambda)$ of said lamp is calculated using an equation (3), $$Q_{std}(\lambda) = \frac{1 - a_{std}(\lambda) \cdot (1 - c \cdot \rho_{abs}(\lambda))}{c \cdot a_{std}(\lambda) \cdot (1 - \rho_{abs}(\lambda))} \quad (1)$$

$$Q_m(\lambda) = \frac{1 - a_m(\lambda) \cdot (1 - c \cdot \rho_{abs}(\lambda))}{c \cdot a_m(\lambda) \cdot (1 - \rho_{abs}(\lambda))} \quad (2)$$

$$P_m(\lambda) = \frac{I_{m0}(\lambda)}{I_{std0}(\lambda)} \cdot \frac{Q_m(\lambda)}{Q_{std}(\lambda)} \cdot P_{std}(\lambda) \quad (3)$$

where $a_{std}(\lambda) = I_{std1}(\lambda)/I_{std0}(\lambda)$, $a_m(\lambda) = I_{m1}(\lambda)/I_{m0}(\lambda)$, $c = s/A$, $I_{std0}(\lambda)$ indicates an output from said photometer means when said standard lamp is lightened inside said integrating sphere with said light absorption means deactivated, $I_{std1}(\lambda)$ indicates an output from said photometer means when said standard lamp is lightened inside said integrating sphere with said light absorption means activated, $I_{m0}(\lambda)$ indicates an output from said photometer means when said lamp is lightened inside said integrating sphere with said light absorption means deactivated, and $I_{m1}(\lambda)$ indicates an output from said photometer means when said lamp is lightened inside said integrating sphere with said light absorption means activated.

2. The luminous flux measuring apparatus according to claim 1, further comprising a total flux operation means for calculating a total flux value $F_m$ of said lamp using an equation given by $$F_m = K_m \cdot \Sigma(P_m(\lambda) \cdot V(\lambda) \cdot \lambda) \quad (4)$$

where $V(\lambda)$, $\lambda$, and $K_m$ indicate a standard luminous efficacy, a wave range of the $P_m(\lambda)$, and a maximum luminous efficacy ($K_m = 683$ lm/W), respectively.

3. The luminous flux measuring apparatus according to claim 2, wherein said light absorption means is a light absorption sheet to be overlaid on a specific portion of an interior wall surface of said integrating sphere.

4. The luminous flux measuring apparatus according to claim 2, wherein said light absorption means is an optical attenuator securely mounted on said integrating sphere and having a light absorption portion extending radially outwardly from a peripheral edge of an opening defined in said integrating sphere, said absorption portion taking a form of a hollow circular cone and having an interior surface coated with a light absorption material, which absorbs all light transmitted through said opening, said optical attenuator also having a cover for covering said opening.

5. A luminous flux measuring apparatus comprising:

a standard lamp having a known spectral radiant flux value of $P_{std}(\lambda)$;

an integrating sphere having an interior surface area of A and also having a light sensing window defined therein;

a lamp holder for holding and lightening any one of said standard lamp and a lamp to be measured inside said integrating sphere;

a photometer means for measuring light transmitted through said light sensing window;

a first light shielding means for shielding, when said any one of said standard lamp and said lamp is lightened inside said integrating sphere, a portion of light emitted therefrom that travels directly towards said light sensing window;

a light absorption means for attenuating, when said any one of said standard light and said lamp is lightened, light inside said integrating sphere, said light absorption means having a spectral reflectance of $\rho_{abs}(\lambda)$ and an area of s required to attenuate the light inside said integrating sphere;

a second light shielding means for shielding, when said any one of said standard lamp and said lamp is lightened inside said integrating sphere, a portion of light emitted therefrom that travels directly towards said light absorption means;

a spectral radiant flux operation means for calculating a spectral radiant flux $P_m(\lambda)$ of said lamp upon receipt of outputs from said photometer means; and an interreflection operation means for calculating an irradiance $D_{std}(\lambda)$ per unit spectral radiant flux of said standard lamp and an irradiance $D_m(\lambda)$ per unit spectral radiant flux of said lamp at said light sensing window, wherein said spectral radiant flux operation means calculates, when said standard lamp is held by said lamp holder and is lightened inside said integrating sphere, a spectral efficiency $Q_{std}(\lambda)$ of said integrating sphere using an equation (1), and also calculates, when said lamp is held by said lamp holder and is lightened inside said integrating sphere, a spectral efficiency $Q_m(\lambda)$ of said integrating sphere using an equation (2), said spectral radiant flux operation means further calculating, when said standard lamp is held by said lamp holder and is lightened inside said integrating sphere, a spectral reflectance $\rho_{std}(\lambda)$ of said integrating sphere using an equation (5), and also calculating, when said lamp is held by said lamp holder and is lightened inside said integrating sphere, a spectral reflectance $\rho_m(\lambda)$ of said integrating sphere using an equation (6), wherein the irradiance $D_{std}(\lambda)$ and the irradiance $D_m(\lambda)$ are calculated upon input of the spectral reflectances $\rho_{std}(\lambda)$ and $\rho_m(\lambda)$, data indicating a structure of said luminous flux measuring apparatus and data indicating luminous intensity distributions of said standard lamp and said lamp into said interreflection operation means, and wherein the spectral radiant flux $P_m(\lambda)$ of said lamp is calculated using an equation (7), $$Q_{std}(\lambda) = \frac{1 - a_{std}(\lambda) \cdot (1 - c \cdot \rho_{abs}(\lambda))}{c \cdot a_{std}(\lambda) \cdot (1 - \rho_{abs}(\lambda))} \quad (1)$$

$$Q_m(\lambda) = \frac{1 - a_m(\lambda) \cdot (1 - c \cdot \rho_{abs}(\lambda))}{c \cdot a_m(\lambda) \cdot (1 - \rho_{abs}(\lambda))} \quad (2)$$

$$\rho_{std}(\lambda) = \frac{1 - a_{std}(\lambda) \cdot (1 - c \cdot \rho_{abs}(\lambda))}{1 - a_{std}(\lambda) \cdot (1 - c)} \quad (5)$$

$$\rho_m(\lambda) = \frac{1 - a_m(\lambda) \cdot (1 - c \cdot \rho_{abs}(\lambda))}{1 - a_m(\lambda) \cdot (1 - c)} \quad (6)$$

$$P_m(\lambda) = \frac{I_{m0}(\lambda)}{I_{std0}(\lambda)} \cdot \frac{Q_m(\lambda)}{Q_{std}(\lambda)} \cdot \frac{D_m(\lambda)}{D_{std}(\lambda)} \cdot P_{std}(\lambda) \quad (7)$$

where $a_{std}(\lambda) = I_{std1}(\lambda)/I_{std0}(\lambda)$, $a_m(\lambda) = I_{m1}(\lambda)/I_{m0}(\lambda)$, $c = s/A$, $I_{std0}(\lambda)$ indicates an output from said photometer means when said standard lamp is lightened inside said integrating sphere with said light absorption means deactivated, $I_{std1}(\lambda)$ indicates an output from said photometer means when said standard lamp is lightened inside said integrating sphere with said light absorption means activated, $I_{m0}(\lambda)$ indicates an output from said photometer means when said lamp is lightened inside said integrating sphere with said light absorption means deactivated, and $I_{m1}(\lambda)$ indicates an output from said photometer means when said lamp is lightened inside said integrating sphere with said light absorption means activated.

6. The luminous flux measuring apparatus according to claim 5, further comprising a total flux operation means for calculating a total flux value $F_m$ of said lamp using an equation (4), $$F_m = K_m \cdot \Sigma(P_m(\lambda) \cdot V(\lambda) \cdot \lambda) \quad (4)$$

where $V(\lambda)$, $\lambda$, and $K_m$ indicate a standard luminous efficacy, a wave range of the $P_m(\lambda)$, and a maximum luminous efficacy ($K_m = 683$ lm/W), respectively.

7. The luminous flux measuring apparatus according to claim 6, wherein said light absorption means is a light absorption sheet to be overlaid on a specific portion of an interior wall surface of said integrating sphere.

8. The luminous flux measuring apparatus according to claim 6, wherein said light absorption means is an optical attenuator securely mounted on said integrating sphere and having a light absorption portion extending radially outwardly from a peripheral edge of an opening defined in said integrating sphere, said absorption portion taking a form of a hollow circular cone and having an interior surface coated with a light absorption material, which absorbs all light transmitted through said opening, said optical attenuator also having a cover for covering said opening.

* * * * *